United States Patent Office 3,354,221
Patented Nov. 21, 1967

3,354,221
PRODUCTION OF PHENOLS
Phillip S. Landis, Woodbury, and Paul B. Venuto, Cherry Hill Township, Camden County, N.J., assignors to Mobil Oil Corporation, a corporation of New York
No Drawing. Filed Aug. 12, 1963, Ser. No. 301,660
13 Claims. (Cl. 260—592)

This application is directed to the preparation of phenols and, more particularly, to the use of crystalline aluminosilicate zeolite catalysts in the preparation of phenols.

The preparation of phenolic ketones through the re-arrangement of phenolic esters in the presence of an aluminum chloride catalyst has long been known and is referred to as the Fries reaction on behalf of its discoverer. This reaction may be illustrated as follows:

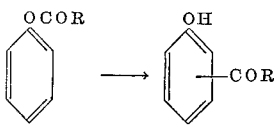

wherein R is either an aliphatic or aromatic radical and with the hydroxy ketone reaction product containing the ketone group substantially completely in either or both of the ortho or para positions. [Details of this process and of its various ramifications are disclosed at length in Chapter 11 (pp. 342–369) of vol. 1 of "Organic Reactions," edited by R. Adams et al., John Wiley & Sons, New York (1942), which chapter is hereby incorporated by reference.] As a result of the facility with which the ortho and para isomers of the resulting ketonic phenol may be removed from one another, the Fries re-arrangement reaction has provided a convenient route both to the ortho and para ketonic derivatives of phenols.

In accordance with the present invention, it has now been discovered that the Fries re-arrangement reaction may now be carried out extremely satisfactorily and economically by means of a unique class of catalytic materials other than the conventionally employed aluminum chloride catalyst, namely crystalline aluminosilicate zeolites. Such catalysts increase the commercial feasibility of the reaction since such crystalline aluminosilicates have an extremely long life and may be readily regenerated for re-use. Aluminum chloride, on the other hand, cannot be regenerated readily.

It is accordingly a primary object of the present invention to provide a novel technique for conducting Fries re-arrangement reactions.

It is still another important object of the present invention to provide a novel method of carrying out a Fries re-arrangement reaction by means of solid porous crystalline aluminosilicate zeolite catalysts.

It is a further object of the present invention to conduct a Fries re-arrangement reaction under particularly practicable conditions through the utilization of the acid and/or rare earth forms of solid porous crystalline aluminosilicate zeolite catalysts.

It is still another important object of the present invention to provide a novel method of carrying out a Fries re-arrangement reaction by means of solid porous crystalline aluminosilicate zeolite catalysts and under sufficient pressure to permit liquid phase operation substantially throughout the conversion.

It is still another important object of the present invention to provide a novel method of carrying out a Fries re-arrangement reaction by means of solid porous crystalline aluminosilicate zeolite catalysts wherein an inert carrier gas is employed during the conversion for removing entrapped starting and product compounds from the catalyst.

It is still another important object of the present invention to provide a novel method of carrying out a Fries re-arrangement reaction by means of solid porous crystalline aluminosilicate zeolite catalysts wherein an inert solvent is employed to remove polar reaction products from the catalyst.

It is still another object of the present invention to provide a method for converting a compound of the general formula

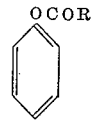

to a compound of the general formula

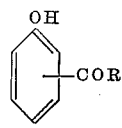

wherein R is selected from the group consisting of aliphatic and aromatic substituents, comprising carrying out said conversion under conversion conditions in the presence of a solid porous crystalline aluminosilicate zeolite catalyst or isomorphs thereof.

These and further important advantages of the present invention will become more apparent upon reference to the ensuing description and appended claims.

Zeolitic materials, both natural and synthetic, in naturally occurring and modified forms, have been demonstrated in the past to have catalytic capabilities for various types of hydrocarbon conversion and other reactions involving the synthesis or modification of various organic materials. Such zeolitic materials are ordered crystalline aluminosilicates having a definite crystalline structure within which there are passages, pores or cavities of definite ranges of size. Since the dimensions of these pores are such as to accept for adsorption molecules of certain dimensions while rejecting those of larger dimensions, these materials have come to be known as "molecular sieves" and are utilized in a variety of ways to take advantage of these properties.

The present invention, as aforesaid, involves the use of such zeolitic materials for the purpose of carrying out a Fries re-arrangement reaction to form ketonic phenols under conditions which are extremely satisfactory for practicable commercial operations and with surprisingly superior results.

As previously indicated, the Fries re-arrangement of the present arrangement will take place in accordance with the following general equation:

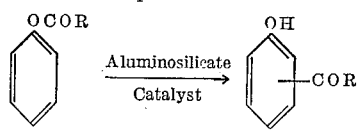

wherein R is either an aliphatic or aromatic radical and with the hydroxy ketone reaction product containing the ketone group substantially completely in either or both of the ortho or para positions. Generally speaking, the esters useable as starting materials in this reaction may be any of those normally operable to form hydroxy ketones in the Fries re-arrangement reaction. A large variety of such esters is set forth in the chapter of "Organic Reactions" previously referred to and these may be considered representative of useable esters in the process of the present invention.

The aluminosilicates useable as catalysts in accordance with the present invention include a wide variety of positive ion-containing crystalline aluminosilicates, both natural and synthetic. These aluminosilicates can be described as a rigid three-dimensional network of $SiO_4$ and $AlO_4$ tetrahedra in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example, an alkali metal or an alkaline earth metal cation. This equilibrium can be expressed by formula wherein the ratio of $Al_2$ to the number of the various cations, such as Ca, Sr, $Na_2$, $K_2$ or $Li_2$, is equal to unity. One cation may be exchanged either in entirety or partially by another cation utilizing ion exchange techniques as discussed hereinbelow. By means of such cation exchange, it is sometimes possible, or even desirable, to vary the size of the pores in the given aluminosilicate by suitable selection of the particular cation. The spaces between the tetrahedra are occupied by molecules of water prior to dehydration.

A description of zeolites of the type useable in the present invention is found in Patent 2,971,824, whose disclosure is hereby incorporated herein by reference. These aluminosilicates have well-defined intra-crystalline dimensions such that only reactant or product molecules of suitable size and shape may be transported in either direction between the exterior phase and the interior of the crystalline zeolite.

In their hydrated form, the aluminosilicates may be represented by the formula:

$$M_{2/n}O:Al_2O_3:wSiO_2:yH_2O \qquad (I)$$

wherein M is a cation which balances the electrovalence of the tetrahedra, $n$ represents the valence of the cation, $w$ the moles of $SiO_2$, and $y$ the moles of $H_2O$, the removal of which produces the characteristic open network system. The cation may be any one or more of a number of positive ions as aforesaid, such ions being discussed in greater detail hereinafter. The parent zeolite is dehydrated to actuate it for use as a catalyst. Although the proportions of inorganic oxides in the silicates and their spatial arrangement may vary, effecting distinct properties in the aluminosilicates, the main characteristic of these materials is their ability to undergo dehydration without substantially affecting the $SiO_4$ and $AlO_4$ framework. In this respect, this characteristic is essential for obtaining catalyst compositions of high activity in accordance wtih the invention.

Representative materials include a synthetic faujasite, designated Zeolite X, which can be represented in terms of mole ratios of oxides as follows:

$$1.0\pm0.2M_{2/n}O:Al_2O_3:2.5\pm0.5SiO_2:yH_2O \qquad (II)$$

wherein M is a metal cation having a valence of not more than three, $n$ represents the valence of M, and $y$ is a value up to eight depending on the identity of M and degree of hydration of the crystal. The sodium form may be represented in terms of mole ratios of oxides as follows:

$$0.9Na_2O:Al_2O_3:2.5SiO_2:6.1H_2O \qquad (III)$$

Another synthesized crystalline aluminosilicate, designated Zeolite A, can be represented in mole ratios of oxides as:

$$1.0\pm0.2M_{2/n}O:Al_2O_3:1.85\pm0.5SiO_2:yH_2O \qquad (IV)$$

wherein M represents a metal cation, $n$ is the valence of M, and $y$ is any value up to about 6. As usually prepared, Zeolite A contains primarily sodium cations and is designated sodium Zeolite A.

Other suitable synthesized crystalline aluminosilicates are those designated Zeolite Y, L and D.

The formula for Zeolite Y (which is a synthetic faujasite) expressed in oxide mole ratios is:

$$0.9\pm0.2Na_2O:Al_2O_3:wSiO_2:yH_2O \qquad (V)$$

wherein $w$ is a value ranging from 3 to 6 and $y$ may be any value up to about 9.

The composition of Zeolite L in oxide mole ratios may be represented as:

$$1.0\pm0.1M_{2/n}O:Al_2O_3:6.4\pm0.5SiO_2:yH_2O \qquad (VI)$$

wherein M designates a metal cation, $n$ represents the valence of M, and $y$ is any value from 0 to 7.

The formula for Zeolite D, in terms of oxide mole ratios, may be represented as:

$$0.9\pm0.2[xNa_2O:(1-x)K_2O]:Al_2O_3:wSiO_2:yH_2O \qquad (VII)$$

wherein $x$ is a value of 0 to 1, $w$ is from 4.5 to about 4.9 and $y$, in the fully hydrated form, is about 7.

Other synthetic crystalline aluminosilicates which can be used include those designated as Zeolite R, S, T, Z, E, F, Q and B.

The formula for Zeolite R in terms of oxide mole ratios may be written as follows:

$$0.9\pm0.2Na_2O:Al_2O_3:wSiO_2:yH_2O \qquad (VIII)$$

wherein $w$ is from 2.45 to 3.65, and $y$, in the hydrated form, is about 7.

The formula for Zeolite S in terms of oxide mole ratios may be written as:

$$0.9\pm0.2Na_2O:Al_2O_3:wSiO_2:yH_2O \qquad (IX)$$

wherein $w$ is from 4.6 to 5.9 and $y$, in the hydrated form, is about 6 to 7.

The formula for Zeolite T in terms of oxide mole ratios may be written as:

$$1.1\pm0.4xNa_2O:(1-x)K_2O:Al_2O_3:6.9\pm0.5SiO_2:yH_2O \qquad (X)$$

wherein $x$ is any value from about 0.1 to about 0.8 and $y$ is any value from about 0 to about 8.

The formula for Zeolite Z in terms of oxide mole ratios may be written as:

$$K_2O:Al_2O_3:2SiO_2:yH_2O \qquad (XI)$$

wherein $y$ is any value not exceeding 3.

The formula for Zeolite E in terms of oxide mole ratios may be written as:

$$0.9\pm0.1M_{2/n}O:Al_2O_3:1.95\pm0.1SiO_2:yH_2O \qquad (XII)$$

wherein M is a metal cation, $n$ is the valence of the cation, and $y$ is a value of 0 to 4.

The formula for Zeolite F in terms of oxide mole ratios may be written as:

$$0.95\pm0.15M_{2/n}O:Al_2O_3:2.05\pm0.3SiO_2:yH_2O \qquad (XIII)$$

wherein M is a metal cation, $n$ is the valence of the cation, and $y$ is any value from 0 to about 3.

The formula for Zeolite Q, expressed in terms of oxide mole ratios, may be written as:

$$0.95\pm0.05M_{2/n}O:Al_2O_3:2.2\pm0.05SiO_2yH_2O \qquad (XIV)$$

wherein M is a metal cation, $n$ is the valence of the cation, and $y$ is any value from 0 to 5.

The formula for Zeolite B may be written in terms of oxide mole ratios as:

$$1.0\pm0.2M_{2/n}O:Al_2O_3:3.5\pm1.5SiO_2yH_2O \qquad (XV)$$

wherein M represents a metal cation, $n$ is the valence of the cation, and $y$ has an average value of 5.1 but may range from 0 to 6.

Other synthesized crystalline aluminosilicates include these designated as ZK-4 and ZK-5.

ZK-4 can be represented in terms of mole ratios of oxides as:

$$0.1 \text{ to } 0.3 \text{ R}:0.7 \text{ to } 1.0M_{2/n}O:Al_2O_3:2.5 \text{ to } 4.0SiO_2:yH_2O \qquad (XVI)$$

wherein R is a member selected from the group consisting of methylammonium oxide, hydrogen oxide and mixtures thereof with one another, M is a metal cation, $n$ is the valence of the cation, and $y$ is any value from about 3.5 to about 5.5. As usually synthesized, Zeolite ZK-4 contains primarily sodium cations and can be represented by unit cell formula:

$$7.5\pm2Na:2\pm0.5H:9\pm2AlO_2:15\pm2SiO_2 \qquad (XVII)$$

The major lines of the X-ray diffraction pattern of ZK-4 are set forth in Table I below:

Table 1

| $d$ Value of reflection in A. | $100 I/I_0$ |
|---|---|
| 12.00 | 100 |
| 9.12 | 29 |
| 8.578 | 73 |
| 7.035 | 52 |
| 6.358 | 15 |
| 5.426 | 23 |
| 4.262 | 11 |
| 4.062 | 49 |
| 3.662 | 65 |
| 3.391 | 30 |
| 3.254 | 41 |
| 2.950 | 54 |
| 2.725 | 10 |
| 2.663 | 7 |
| 2.593 | 15 |
| 2.481 | 2 |
| 2.435 | 1 |
| 2.341 | 2 |
| 2.225 | 2 |
| 2.159 | 4 |
| 2.121 | 5 |
| 2.085 | 2 |
| 2.061 | 2 |
| 2.033 | 5 |
| 1.90 | 2 |
| 1.880 | 2 |
| 1.828 | 1 |
| 1.813 | 1 |
| 1.759 | 1 |
| 1.735 | 1 |
| 1.720 | 5 |
| 1.703 | 1 |
| 1.669 | 2 |
| 1.610 | 1 |
| 1.581 | 2 |
| 1.559 | 1 |

ZK-4 can be prepared by preparing an aqueous solution of oxides containing $Na_2O$, $Al_2O_3$, $SiO_2$, $H_2O$ and tetramethyl-ammonium ion having a composition, in terms of oxide mole ratios, which falls within the following ranges:

| $SiO_2/Al_2O_3$ | 2.5 to 11 |
|---|---|
| $\dfrac{Na_2O}{Na_2O + [(CH_3)_4N]_2O}$ | 0.5 to 2.5 |
| $\dfrac{Na_2O + [(CH_3)_4N]_2O}{SiO_2}$ | 1 to 2 |
| $\dfrac{H_2O}{Na_2O + [(CH_3)_4N]_2O}$ | 25 to 50 | maintaining the mixture at a temperature of about 100° C. to 120° C. until the crystals are formed, and separating the crystals from the mother liquor. The crystal material is thereafter washed until the wash effluent has a pH essentially that of wash water and subsequently dried.

ZK-5 is representative of another crystalline aluminosilicate which is prepared in the same manner as Zeolite ZK-4 except that N,N'-dimethyltriethylenediammonium hydroxide is used in place of tetramethylammonium hydroxide. ZK-5 may be prepared from an aqueous sodium aluminosilicate mixture having the following composition expressed in terms of oxide mole ratios as:

| $SiO_2/Al_2O_3$ | 2.5 to 11 |
|---|---|
| $\dfrac{Na_2O}{Na_2O + [(CH_2)_6N_2(CH_3)_2]OH}$ | 0.5 to 2.5 |
| $\dfrac{H_2O}{Na_2O + [(CH_2)_6N_2(CH_3)_2]OH}$ | 25 to 50 |
| $\dfrac{Na_2O + [(CH_2)_6N_2(CH_3)_2]OH}{SiO_2}$ | 1 to 2 |

The N,N'-dimethyltriethylenediammonium hydroxide used in preparing ZK-5 can be prepared by methylating 1,4-diazabicyclo-(2.2.2)-octane with methyl iodide or dimethyl sulfate, followed by conversion to the hydroxide by treatment with silver oxide or barium hydroxide. The reaction may be illustrated as follows:

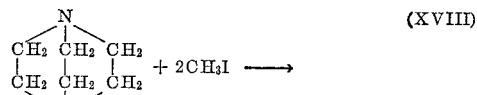 (XVIII)

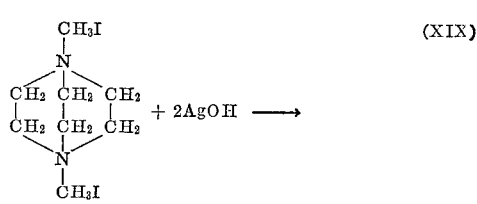 (XIX)

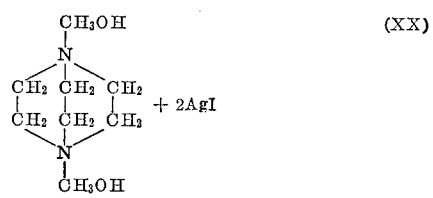 (XX)

In using the N,N'-dimethyltriethylenediammonium hydroxide compound in the preparation of ZK-5, the hydroxide may be employed per se, or further treated with a source of silica, such as silica gel, and thereafter reacted with aqueous sodium aluminate in a reaction mixture whose chemical composition corresponds to the above-noted oxide mole ratios. Upon heating at temperatures of about 200 to 600° C., the methyl ammonium ion is converted to hydrogen ion.

Quite obviously, the above-listed molecular sieves are only representative of the synthetic crystalline aluminosilicate molecular sieve catalysts which may be used in accordance with the process of the present invention, the particular enumeration of such sieves not being intended to be exclusive.

At the present time, two commercially available molecular sieves are those of the "A" series and of the "X" series. A synthetic zeolite known as "Molecular Sieve 4A" is a crystalline sodium aluminosilicate having an effective pore diameter of about 4 angstroms. In the hydrated form, this material is chemically characterized by the formula:

$$Na_{12}(AlO_2)_{12}(SiO_2)_{12} \cdot 27H_2O$$

The synthetic zeolite known as "Molecular Sieve 5A" is a crystalline alumino-silicate salt having an effective pore diameter of about 5 angstroms and in which substantially all of the 12 ions of sodium in the immediately above formula are replaced by calcium, it being understood that calcium replaces sodium in the ratio of one calcium ion for two sodium ions. A crystalline sodium aluminosilicate is also available commercially under the name of "Molecular Sieve 13X." The letter "X" is used to distinguish the inter-atomic structure of this zeolite from that of the "A" crystal mentioned above. As initially prepared and before activation by dehydration, the 13X material contains water and has the unit cell formula $$Na_{86}[(AlO_2)_{86}(SiO_2)_{106}] \cdot 267H_2O$$

The synthetic zeolite known as "Molecular Sieve 10X" is a crystalline aluminosilicate salt in which a substantial proportion of the sodium ions of the 13X material have been replaced by calcium.

Among the naturally occurring crystalline aluminosilicates which can be employed for purposes of the invention, the preferred aluminosilicates are those which sorb hydrocarbons above $C_3$. Exemplary of such aluminosilicates are faujasite, heulandite, clinoptilolite, dachiardite, and aluminosilicates represented as follows:

Chabazite _____ $Na_2O.Al_2O_3.4SiO_2.6H_2O$
Gmelinite _____ $Na_2O.Al_2O_3.4SiO_2.6H_2O$
Mordenite _____ $Na_2O.Al_2O_3.10SiO_2.6H_2O$ Other aluminosilicates which can be used are those resulting from caustic treatment of various clays.

Of the clay materials, montmorillonite and kaolin families are representative types which include the sub-bentonites, such as bentonite, and the kaolins commonly identified as Dixie, McNamee, Georgia and Florida clays in which the main mineral constituent is halloysite, kaolinite, dickite, nacrite or anauxite. Such clays may be used in the raw state as originally mined or initially subjected to calcination, acid treatment or chemical modification. In order to render the clays suitable for use, however, the clay material is treated with sodium hydroxide or potassium hydroxide, preferably in admixture with a source of silica, such as sand, silica gel or sodium silicate, and calcined at temperatures ranging from 230° F. to 1600° F. Following calcination, the fused material is crushed, dispersed in water and digested in the resulting alkaline solution. During the digestion, materials with varying degrees of crystallinity are crystallized out of solution. The solid material is separated from the alkaline material and thereafter washed and dried. The treatment can be effected by reacting mixtures falling within the following weight ratios:

$Na_2O$/clay (dry basis) _____ 1.0–6.6 to 1
$SiO_2$/clay (dry basis) _____ 0.01–3.7 to 1
$H_2O/Na_2O$ (mole ratio) _____ 35–180 to 1

Molecular sieves are ordinarily prepared initially in the sodium form of the crystal. The sodium ions in such form may, as desired, be exchanged for other cations, as will be described in greater detail below. In general, the process of preparation involves heating, in aqueous solution, an appropriate mixture of oxides, or of materials whose chemical composition can be completely represented as a mixture of oxides $Na_2O$, $Al_2O_3$, $SiO_2$ and $2_2O$ at a temperature of approximately 100° C. for periods of 15 minutes to 90 hours or more. The product which crystallizes within this hot mixture is separated therefrom and water washed until the water in equilibrium with the zeolite has a pH in the range of 9 to 12. After activating by heating until dehydration is attained, the substance is ready for use.

For example, in the preparation of sodium zeolite "A," suitable reagents for the source of silica include silica sol, silica gel, silicic acid or sodium silicate. Alumina can be supplied by utilizing activated alumina, gamma alumina, alpha alumina, aluminum trihydrate or sodium aluminate. Sodium hydroxide is suitably used as the source of the sodium ion and in addition contributes to the regulation of the pH. All reagents are preferably soluble in water. The reaction solution has a composition, expressed as mixtures of oxides, within the following ranges: $SiO_2/Al_2O_3$ of 0.5 to 2.5, $Na_2O/SiO_2$ of 0.8 to 3.0 and $H_2O/Na_2O$ of 35 to 200. A convenient and generally employed process of preparation involves preparing an aqueous solution of sodium aluminate and sodium hydroxide and then adding with stirring an aqueous solution of sodium silicate.

The reaction mixture is placed in a suitable vessel which is closed to the atmosphere in order to avoid losses of water and the reagents are then heated for an appropriate length of time. Adequate time must be used to allow for recrystallization of the first amorphous precipitate that forms. While satisfactory crystallization may be obtained at temperatures from 21° C. to 150° C., the pressure being atmospheric or less, corresponding to the equilibrium of the vapor pressure with the mixture at the reaction temperature, crystallization is ordinarily carried out at about 100° C. As soon as the zeolite crystals are completely formed they retain their structure and it is not essential to maintain the temperature of the reaction any longer in order to obtain a maximum yield of crystals.

After formation, the crystalline zeolite is separated from the mother liquor, usually by filtration. The crystalline mass is then washed, preferably with salt-free water, while on the filter, until the wash water, in equilibrium with the zeolite, reaches a pH of 9 to 12. The crystals are then dried at a temperature between 25° C. and 150° C. Activation is attained upon dehydration, as for example at 350° C. and 1 mm. pressure or at 350° C. in a stream of dry air.

It is to be noted that the material first formed on mixing the reactants is an amorphous precipitate which is, generally speaking, not catalytically active in the process of the invention. It is only after transformation of the amorphous precipitate to crystalline form that the highly active catalyst described herein is obtained.

Molecular sieves of the other series may be prepared in a similar manner, the composition of the reaction mixture being varied to obtain the desired ratios of ingredients for the particular sieve in question.

The molecular sieve catalysts useable in the process of the present invention may be in the sodium form as aforesaid or may contain other cations, including other metallic cations and/or hydrogen. In preparing the non-sodium forms of the catalyst composition, the aluminosilicate can be contacted with a non-aqueous or aqueous fluid medium comprising a gas, polar solvent or water solution containing the desired positive ion. Where the aluminosilicate is to contain metal cations, the metal cations may be introduced by means of a salt soluble in the fluid medium. When the aluminosilicate is to contain hydrogen ions, such hydrogen ions may be introduced by means of a hydrogen ion-containing fluid medium or a fluid medium containing ammonium ions capable of conversion to hydrogen ions.

In those cases in which the aluminosilicate is to contain both metal cations and hydrogen ions, the aluminosilicate may be treated with a fluid medium containing both the metal salt and hydrogen ions or ammonium ions capable of conversion to hydrogen ions. Alternatively, the aluminosilicate can be first contacted with a fluid medium containing a hydrogen ion or ammonium ion capable of conversion to a hydrogen ion and then with a fluid medium containing at least one metallic salt. Similarly, the aluminosilicate can be first contacted with a fluid medium containing at least one metallic salt and then with a fluid medium containing a hydrogen ion or an ion capable of conversion to a hydrogen ion or a mixture of both.

Water is the preferred medium for reasons of economy and ease of preparation in large scale operations involving continuous or batchwise treatment. Similarly, for this reason, organic solvents are less preferred but can be employed providing the solvent permits ionization of the acid, ammonium compound and metallic salt. Typical solvents include cyclic and acyclic ethers such as dioxane, tetrahydrofuran, ethyl ether, diethyl ether, diisopropyl ether, and the like; ketones such as acetone and methyl ethyl ketone; esters such as ethyl acetate, propyl acetate; alcohols such as ethanol, propanol, butanol, etc.; and miscellaneous solvents such as dimethylformamide, and the like.

The hydrogen ion, metal cation or ammonium ion may be present in the fluid medium in an amount varying within wide limits dependent upon the pH value of the fluid medium. Where the aluminosilicate material has a molar ratio of silica to alumina greater than about 5.0, the fluid medium may contain a hydrogen ion, metal cation, ammonium ion, or a mixture thereof, equivalent to a pH value ranging from less than 1.0 up to a pH value of about 10.0. Within these limits, pH values for fluid media containing a metallic cation and/or an ammonium ion range from 4.0 to 10.0, and are preferably between a pH value of 4.5 to 8.5. For fluid media containing a hydrogen ion alone or with a metallic cation, the pH values range from less than 1.0 up to about 7.0 and are preferably within the range of less than 3.0 up to 6.0. Where the molar ratio of the aluminosilicate is greater than about 3.0 and less than about 5.0, the pH value for the fluid media containing a hydrogen ion or a metal cation ranges from 3.8 to 8.5. Where ammonium ions are employed, either alone or in combination with metallic cations, the pH value ranges from 4.5 to 9.5 and is preferably within the limit of 4.5 to 8.5. When the aluminosilicate material has a molar ratio of silica to alumina less than about 3.0, the preferred medium is a fluid medium containing an ammonium ion instead of a hydrogen ion. Thus, depending upon the silica to alumina ratio, the pH value varies within rather wide limits.

In carrying out the treatment with the fluid medium, the procedure employed comprises contacting the aluminosilicate with the desired fluid medium or media until such time as metallic cations originally present in the aluminosilicate are removed to the desired extent. Repeated use of fresh solutions of the entering ion is of value to secure more complete exchange. Effective treatment with the fluid medium to obtain a modified aluminosilicate having high catalytic activity will vary, of course, with the duration of the treatment and temperature at which it is carried out. Elevated temperatures tend to hasten the speed of treatment whereas the duration thereof varies inversely with the concentration of the ions in the fluid medium. In general, the temperatures employed range from below ambient room temperature of 24° C. up to temperatures below the decomposition temperature of the aluminosilicate. Following the fluid treatment, the treated aluminosilicate is washed with water, preferably distilled water, until the effluent wash water has a pH value of wash water, i.e., between about 5 and 8. The aluminosilicate material is thereafter analyzed for metallic ion content by methods well known in the art. Analysis also involves analyzing the effluent wash for anions obtained in the wash as a result of the treatment, as well as determination of and correction for anions that pass into the effluent wash from soluble substances or decomposition products of insoluble substances which are otherwise present in the aluminosilicate as impurities. The aluminosilicate is then dried and dehydrated.

The actual procedure employed for carrying out the fluid treatment of the aluminosilicate may be accomplished in a batchwise or continuous method under atmospheric, subatmospheric or superatmospheric pressure. A solution of the ions of positive valence in the form of a molten material, vapor, aqueous or non-aqueous solution, may be passed slowly through a fixed bed of the aluminosilicate. If desired, hydrothermal treatment or a corresponding non-aqueous treatment with polar solvents may be effected by introducing the aluminosilicate and fluid medium into a closed vessel maintained under autogenous pressure. Similarly, treatments involving fusion or vapor phase contact may be employed providing the melting point or vaporization temperature of the acid or ammonium compound is below the decomposition temperature of the aluminosilicate.

A wide variety of acidic compounds can be employed with facility as a source of hydrogen ions and include both inorganic and organic acids.

Representative inorganic acids which can be employed include acids such as hydrochloric acid, hypochlorous acid, chloroplatinic acid, sulfuric acid, sulfurous acid, hydrosulfuric acid, peroxydisulfonic acid ($H_2S_2O_8$), peroxymonosulfuric acid ($H_2SO_5$), dithionic acid ($H_2S_2O_6$), sulfamic acid ($H_2NHS_3H$), amidodisulfonic acid $$(NH(SO_3H)_2)$$

chlorosulfuric acid, thiocyanic acid, hyposulfurous acid ($H_2S_2O_4$), pyrosulfuric acid ($H_2S_2O_7$), thiosulfuric acid ($H_2S_2O_3$), nitrosulfonic acid ($HSO_3.NO$), hydroxylamine disulfonic acid [$(HSO_3)_2NOH$], nitric acid, nitrous acid, hyponitrous acid, carbonic acid and the like.

Typical organic acids which find utility in the practice of the invention include the monocarboxylic, dicarboxylic and polycarboxylic acids which can be aliphatic, aromatic or cycloaliphatic in nature.

Representative aliphatic monocarboxylic, dicarboxylic and polycarboxylic acids include the saturated and unsaturated, substituted and unsubstituted acids such as formic acid, acetic acid, chloroacetic acid, dichloroacetic acid, trichloroacetic acid, bromoacetic acid, propionic acid, 2-bromopropionic acid, 3-bromopropionic acid, lactic acid, n-butyric acid, isobutyric acid, crotonic acid, n-valeric acid, isovaleric acid, n-caproic acid, oenanthic acid, pelargonic acid, capric acid, undecyclic acid, lauric acid, myristic acid, palmitic acid, stearic acid, oxalic acid, malonic acid, succinic acid, glutaric acid, adipic acid, pimelic acid, suberic acid, azelaic acid, sebacic acid, alkylsuccinic acid, alkenylsuccinic acid, maleic acid, fumaric acid, itaconic acid, citraconic acid, mesaconic acid, glutonic acid, muconic acid, ethylidene malonic acid, isopropylidene malonic acid, allyl malonic acid.

Representative aromatic and cycloaliphatic monocarboxylic, dicarboxylic and polycarboxylic acids include 1,2-cyclohexanedicarboxylic acid, 1,4-cyclohexanedicarboxylic acid, 2-carboxy-2-methylcyclohexaneacetic acid, phthalic acid, isophthalic acid, terephthalic acid, 1,8-naphthalenedicarboxylic acid, 1,2-naphthalenedicarboxylic acid, tetrahydrophthalic acid, 3-carboxy-cinnamic acid, hydrocinnamic acid, pyrogallic acid, benzoic acid, ortho, meta and para-methyl, hydroxy, chloro, bromo and nitro-substituted benzoic acids, phenylacetic acid, mandelic acid, benzylic acid, hippuric acid, benzenesulfonic acid, toluenesulfonic acid, methanesulfonic acid and the like.

Other sources of hydrogen ions include carboxy polyesters prepared by the reaction of an excess of polycarboxylic acid or an anhydride thereof and a polyhydric alcohol to provide pendant carboxyl groups.

Still other materials capable of providing hydrogen ions are ion exchange resins having exchangeable hydrogen ions attached to base resins comprising cross-linked resinous polymers of monovinyl aromatic monomers and polyvinyl compounds. These resins are well known materials which are generally prepared by copolymerizing in the presence of a polymerization catalyst one or more monovinyl aromatic compounds, such as styrene, vinyl toluene, vinyl xylene, with one or more divinyl aromatic compounds such as divinyl benzene, divinyl toluene, divinyl xylene, divinyl naphthalene and divinyl acetylene. Following copolymerization, the resins are sulfonated to provide the hydrogen form of the resin.

Still another class of compounds which can be employed are ammonium compounds which decompose to provide hydrogen ions when an aluminosilicate treated with a solution of said ammonium compound is subjected to temperatures below the decomposition temperature of the aluminosilicate.

Representative ammonium compounds which can be employed include ammonium hydroxide, ammonium chloride, ammonium bromide, ammonium iodide, ammonium carbonate, ammonium bicarbonate, ammonium sulfate, ammonium sulfide, ammonium thiocyanate, ammonium dithiocarbamate, ammonium peroxysulfate, ammonium acetate, ammonium tungstate, ammonium molybdate, ammonium benzoate, ammonium borate, ammonium carbamate, ammonium sesquicarbonate, ammonium chloroplumbate, ammonium citrate, ammonium dithionate, ammonium fluoride, ammonium gallate, ammonium nitrate, ammonium nitrite, ammonium formate, ammonium propionate, ammonium butyrate, ammonium valerate, ammonium lactate, ammonium malonate, ammonium oxalate, ammonium palmitate, ammonium tartrate and the like. Still other ammonium compounds which can be employed include complex ammonium compounds such as tetramethylammonium hydroxide, trimethylammonium chloride. Other compounds which can be employed are nitrogen bases such as the salts of guanidine, pyridine, guinoline, etc.

A wide variety of metallic compounds can be employed with facility as a source of metallic cations and include both inorganic and organic salts of the metals of Groups I through VIII of the Periodic Table.

Representative of the salts which can be employed include chlorides, bromides, iodides, carbonates, bicarbonates, sulfates, sulfides, thiocyanates, dithiocarbamates, peroxysulfates, acetates, benzoates, citrates, fluorides, nitrates, nitrites, formates, propionates, butyrates, valerates, lactates, malonates, oxalates, palmitates, hydroxides, tartrates and the like. The only limitation on the particular metal salt or salts employed is that it be soluble in the fluid medium in which it is used. The preferred salts are the chlorides, nitrates, acetates and sulfates.

Rare earth salts may be advantageously employed. Such salts can either be the salt of a single metal or, preferably, of mixtures of metals such as a rare earth chloride or didymium chlorides. As hereinafter referred to, a rare earth chloride solution is a mixture of rare earth chlorides consisting essentially of the chlorides of lanthanum, cerium, neodymium and praseodymium with minor amounts of samarium, gadolinium and yttrium. The rare earth chloride solution is commercially available and it contains the chlorides of a rare earth mixture having the relative composition: cerium (as $CeO_2$) 48% by weight; lanthanum (as $La_2O_3$) 24% by weight; praseodymium (as $Pr_6O_{11}$) 5% by weight; neodymium (as $Nd_2O_3$) 17% by weight; samarium (as $Sm_2O_3$) 3% by weight; gadolinium (as $Gd_2O_3$) 2% by weight; yttrium (as $Y_2O_3$) 0.2% by weight; and other rare earth oxides 0.8% by weight. Didymium chloride is also a mixture of rare earth chlorides, but having a low cerium content. It consists of the following rare earths determined as oxides: lanthanum, 45–46% by weight; cerium, 1–2% by weight; praseodymium, 9–10% by weight; neodymium, 32–33% by weight; samarium, 5–6% by weight; gadolinium, 3–4% by weight; yttrium, 0.4% by weight; other rare earths, 1–2% by weight. It is to be understood that other mixtures of rare earths are equally applicable in the instant invention.

Representative metal salts which can be employed, aside from the mixture mentioned above, include silver nitrate, silver acetate, silver arsenate, silver citrate, silver oxide, silver tartrate, calcium acetate, calcium arsenate, calcium benzoate, calcium bromide, calcium carbonate, calcium chloride, calcium citrate, beryllium bromide, beryllium carbonate, beryllium hydroxide, beryllium sulfate, barium acetate, barium bromide, barium carbonate, barium citrate, barium malonate, barium nitrite, barium oxide, barium sulfide, magnesium chloride, magnesium bromide, magnesium sulfate, magnesium sulfide, magnesium acetate, magnesium formate, magnesium stearate, magnesium tartrate, manganese chloride, manganese sulfate, manganese acetate, manganese carbonate, manganese formate, zinc sulfate, zinc nitrate, zinc acetate, zinc chloride, zinc bromide, aluminum chloride, aluminum bromide, aluminum acetate, aluminum citrate, aluminum nitrate, aluminum oxide, aluminum phosphate, aluminum sulfate, titanium bromide, titanium chloride, titanium nitrate, titanium sulfate, zirconium chloride, zirconium nitrate, zirconium sulfate, chromic acetate, chromic chloride, chromic nitrate, chromic sulfate, ferric chloride, ferric bromide, ferric acetate, ferrous chloride, ferrous arsenate, ferrous lactate, ferrous sulfate, nickel chloride, nickel bromide, cerous acetate, cerous bromide, cerous carbonate, cerous chloride, cerous iodide, cerous sulfate, cerous sulfide, lanthanum chloride, lanthanum bromide, lanthanum nitrate, lanthanum sulfate, lanthanum sulfide, yttrium bromate, yttrium bromide, yttrium chloride, yttrium nitrate, yttrium sulfate, samarium acetate, samarium chloride, samarium bromide, samarium sulfate, neodymium chloride, neodymium oxide, neodymium sulfide, neodymium sulfate, praseodymium chloride, praseodymium bromide, praseodymium sulfate, praseodymium sulfide, selenium chloride, selenium bromide, tellurium chloride, tellurium bromide, etc.

The aluminosilicate catalysts useable in connection with the process of the present invention may be used in powdered, granular or molded state formed into spheres or pellets of finely divided particles having a particle size of 2 to 500 mesh. In cases where the catalyst is molded, such as by extrusion, the aluminosilicate may be extruded before drying, or dried or partially dried and then extruded. The catalyst product is then preferably precalcined in an inert atmosphere near the temperature contemplated for conversion but may be calcined initially during use in the conversion process. Generally, the aluminosilicate is dried between 150° F. and 600° F. and thereafter calcined in air or an inert atmosphere of nitrogen, hydrogen, helium, flue gas or other inert gas at temperatures ranging from about 500° F. to 1500° F. for periods of time ranging from 1 to 48 hours or more.

The aluminosilicate catalysts prepared in the foregoing manner may be used as catalysts per se or as intermediates in the preparation of further modified contact masses consisting of inert and/or catalytically active materials which otherwise serve as a base, support, carrier, binder, matrix or promoter for the aluminosilicate. One embodiment of the invention is the use of the finely divided aluminosilicate catalyst particles in a siliceous gel matrix wherein the catalyst is present in such proportions that the resulting product contains about 2 to 95% by weight, preferably about 5 to 50% by weight, of the aluminosilicate in the final composite.

The aluminosilicate-siliceous gel compositions can be prepared by several methods wherein the aluminosilicate is combined with silica while the latter is in a hydrous state such as in the form of a hydrosol, hydrogel, wet gelatinous precipitate or a mixture thereof. Thus, silica gel formed by hydrolyzing a basic solution of alkali metal silicate with an acid such as hydrochloric, sulfuric, etc., can be mixed directly with finely divided aluminosilicate having a particle size less than 40 microns, preferably within the range of 2 to 7 microns. The mixing of the two components can be accomplished in any desired manner, such as in a ball mill or other types of kneading mills. Similarly, the aluminosilicate may be dispersed in a hydrosol obtained by reacting an alkali metal silicate with an acid or an alkaline coagulent. The hydrosol is then permitted to set in mass to a hydrogel which is thereafter dried and broken into pieces of desired shape, or dispersed through a nozzle into a bath of oil or other water-immiscible suspending medium to obtain spheroidally shaped "bead" particles of catalyst. The aluminosilicate siliceous gel thus obtained is washed free of soluble salts and thereafter dried and/or calcined as desired.

The siliceous gel matrix may also consist of a plural gel comprising a predominant amount of silica with one or more metals or oxides thereof. The preparation of plural gels is well known and generally involves either separate precipitation or coprecipitation techniques in which a suitable salt of the metal oxide is added to an alkali metal silicate and an acid or base, as required, is added to precipitate the corresponding oxides. The silica content of the siliceous gel matrix contemplated herein is generally with the range of 55 to 100 weight percent with the metal oxide content ranging from zero to 45 percent. Minor amounts of promoters or other materials which may be present in the composition include cerium, chromium, cobalt, tungsten, uranium, platinum, lead, zinc, calcium, magnesium, lithium, silver, nickel and their compounds.

The aluminosilicate catalyst may also be incorporated in an alumina gel matrix conveniently prepared by adding ammonium hydroxide, ammonium carbontae, etc. to a salt of aluminum, such as aluminum chloride, aluminum sulfate, aluminum nitrate, etc., in an amount to form aluminum hydroxide, which, upon drying, is converted to alumina. The aluminosilicate catalyst can be mixed with the dried alumina or combined while the alumina is in the form of a hydrosol, hydrogel or wet gelatinous precipitate.

While, as aforesaid, the Fries re-arrangement of the present invention may be carried out using a great variety of solid, porous crystalline aluminosilicate zeolites as catalytic materials, the most effective catalysts for carrying out the present process are the acid crystalline aluminosilicates, viz., those aluminosilicates in which at least a portion of the cations are hydrogen ions. Also particularly effective are those aluminosilicates containing both hydrogen ions and rare earth ions. Rare earth exchanged 13X molecular sieves are also quite effective.

For maximum effectiveness in carrying out the process of the present invention, the crystalline aluminosilicate used as a catalyst for the Fries re-arrangement should have pores or channels of a size such that the reactants will pass into such pores or channels and the reaction products will be removable therefrom. Quite obviously, the particular pore size which is desirable will vary depending upon the particular starting materials utilized and the products to be formed as a result of the Fries re-arrangement. In general, however, it can be stated that the most desirable crystalline alumino-silicates for use in the instant process are those having a pore size of at least about 5 angstrom units. Pore sizes of about 5 to 15 A. are generally desirable with pore sizes of about 6 to 10 A. being preferred.

The reactions of the present invention may be carried out either in the presence or absence of a solvent. It will be noted that in the conventional Fries reaction using aluminum chloride as a catalyst, a solvent such as nitrobenzene plays an important role. A solvent when used in the process of the present invention plays a different role. More specifically, the use of solvents in the practice of the present invention would serve to push polar products off the catalyst. In addition, when the phenolic ester charge or the phenolic product is a high melting solid, it is also desirable to use a solvent. Examples of useful solvents, all of which are inert for purposes of the present invention, include nitrobenzene, benzene, hexane, cyclohexane, carbon tetrachloride and the like.

In certain cases, it may also be advantageous to use carrier gas to push reactants and products off the catalyst so that the products do not merely sit entrapped in the catalyst and undergo side reactions leading to polymer formation and decreased yields and conversions. Inert carrier gases such as nitrogen, carbon dioxide, helium, hydrogen or methane are particularly useful for this purpose.

As is pointed out in chapter 11 of said "Organic Reactions" text previously cited, the temperature at which the Fries re-arrangement is conducted has a great deal to do with the nature of the hydroxy ketone which is produced. For example, it is pointed out therein that the reaction product ordinarily obtained will contain a ketone group either ortho or para to the hydroxyl group (or mixtures thereof) and that the reaction temperature will usually influence the formation of one or the other of such products. Generally speaking, low temperatures favor the formation of the para isomer with high temperatures favoring production of the ortho isomer. While it is difficult to generalize on the temperatures at which each of these results will be particularly influenced due to the great variation resulting from different starting materials, it may be stated that the temperatures employed may range from about 50 to 400° C. Temperatures of about 100–175° C. will particularly favor para isomer formation with temperatures of about 175–250° C. favoring ortho isomer formation. Pressures employed under both sets of conditions may suitably be about 1 to 20 atm., though when solvents are used as previously indicated it is desirable to use higher pressures (i.e., up to about 500 p.s.i.) to maintain the solvent in the liquid phase at the operating temperature. Even in the absence of solvents, it is desirable to operate under sufficient pressure to permit liquid phase operation, since this aids in the desorption of the high boiling point polar phenolic products from within the catalyst and permits the reaction to proceed at lower temperatures than at atmospheric pressure.

Aside from the fact that the starting materials and temperature will influence the nature of the reaction products formed, the nature of the reaction product may also be influenced by the amount of catalyst employed. Generally speaking, space velocities of about 0.1 to 5.0 volumes of reaction fluid/vol. catalyst/hour may be employed for liquid reactant, with space velocities of about 0.5 to 2.0 being preferred.

Where the reaction product comprises a mixture of the ortho and para isomers, these may suitably be separated in a conventional manner, viz., by distillation techniques as set forth in chapter 11 of said "Organic Reactions" text previously cited.

The following examples are illustrative of the general process of this invention:

*Example 1.—Conversion of phenyl acetate*

Conditions:
  REX Catalyst.[1]
  Temperature: 24–177° C. (Liquid Phase).[2]
  Atmospheric Pressure.
  LHSV=1.4.
  $N_2$—carrier (5 cc./min.).

The liquid phase phenyl acetate charge stock[3] was passed into contact with the catalyst over an extended period of time. After 265 minutes on stream and at a temperature of 129° C., reaction products including, in weight percent, 91.8% phenyl acetate, 5.3% phenol, 0.7% o - hydroxyacetophenone and 2.2% p - hydroxyacetophenone were obtained.

*Example 2.—Conversion of phenyl acetate*

Conditions:
  REX Catalyst.[1]
  Temperature: 93–260° C. (liquid phase).
  Pressure: 400 p.s.i.g.
  LHSV=1.5.
  $N_2$—carrier (5 cc./min.).

|  | Weight percent | | | |
| --- | --- | --- | --- | --- |
| Temperature, ° C | 93 | 149 | 204 | 260 |
| Time on Stream, hrs | 4½ | 6¼ | 7¾ | 10 |
| Product:[2] | | | | |
| Phenyl Acetate | 97.2 | 94.2 | 90.3 | 95.0 |
| Phenol | 2.0 | 2.7 | 4.9 | 3.5 |
| o-Hydroxyacetophenone |  | 0.5 | 1.1 | 0.3 |
| p-Hydroxyacetophenone | 0.8 | 2.6 | 3.7 | 1.2 |
|  | 100.0 | 100.0 | 100.0 | 100.0 |

[1] The catalyst was calcined for 1 hr. at 343° C. in air immediately prior to the run.
[2] The liquid products darkened from yellow (at 93° C.) to brown (at 260° C.) with increasing temperature.

*Example 3.—Conversion of phenyl acetate*

Conditions:
  10X pellets.
  Temperature: 177–399° C.
  Pressure: atmospheric.
  LHSV=1.75.
  $N_2$—carrier (5 cc./min.).

The liquid phase phenyl acetate charge stock was passed into contact with the catalyst over an extended period of time. After 285 minutes on stream and at a

[1] Rare earth exchanged X-type molecular sieve.
[2] The boiling point of the liquid phase phenyl acetate charge stock was 195° C.
[3] The charge stock was 99.6 weight percent phenyl acetate.

temperature of 343° C., the reaction products included, by weight percent, 94.7% phenyl acetate, 4.8% phenol, a trace of o - hydroxyacetophenone and 0.5% of p - hydroxyacetophenone. After 325 minutes on stream and at 399° C., the reaction products included 89.9%, 9.1%, 0.4% and 0.6% of said products, respectively.

In the foregoing portions of the specification, a novel process for conducting a Fries re-arrangement reaction by means of crystalline aluminosilicate catalysts has been set forth. It is to be understood, however, that the practice of the present invention is also applicable to isomorphs of said crystalline aluminosilicates. For example, the aluminum may be replaced by elements such as gallium and silicon by elements such as germanium.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method of carrying out a Fries rearrangement reaction, in which a phenolic ester of the type

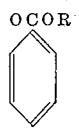

is converted to a hydroxy ketone of the type

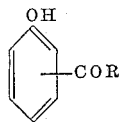

wherein R is selected from the group consisting of aliphatic and aromatic substituents and the —COR radical in the hydroxy ketone is in the ortho or para position, comprising carrying out said reaction at a temperature of about 50–400° C. in the presence of a solid porous crystalline aluminosilicate zeolite catalyst, said aluminosilicate having pores of a size sufficient to permit ingress of said phenolic ester and egress of said hydroxy ketone.

2. A method as defined in claim 1 wherein said aluminosilicate catalyst is in the acid form.

3. A method as defined in claim 1 wherein said aluminosilicate catalyst also contains rare earth cations.

4. A method as defined in claim 1 wherein said aluminosilicate catalyst contains pores of about 5 to 15 A.

5. A method as defined in claim 1 wherein said aluminosilicate catalyst contains pores of about 6 to 10 A.

6. A method as defined in claim 1 wherein said reaction is carried out at a pressure of about 1 to 20 atm. and a space velocity of about 0.1 to 5.0 volumes of said first mentioned compound per volume of said catalyst per hour.

7. A method as defined in claim 6 wherein said space velocity is about 0.5 to 2.0.

8. A method as defined in claim 6 wherein said temperature is about 100–175° C.

9. A method as defined in claim 6 wherein said temperature is about 175–250° C.

10. A method as defined in claim 1 wherein said conversion is carried out under sufficient pressure to permit liquid phase operation substantially throughout the conversion.

11. A method as defined in claim 1 wherein an inert carrier gas is employed during the conversion for removing entrapped starting and product compounds from the catalyst.

12. A method as defined in claim 1 wherein an inert solvent is employed to remove polar reaction products from the catalyst.

13. A method as defined in claim 1 wherein said compound to be converted is phenyl acetate and said catalyst contains rare earth cations.

References Cited

UNITED STATES PATENTS 3,098,099   7/1963   Conte et al. _____ 260—591

DANIEL D. HORWITZ, *Primary Examiner.*